United States Patent [19] [11] 3,929,836
Fothergill et al. [45] Dec. 30, 1975

[54] 2-(2-LOWER ALKYLAMINO-1-HYDROXY-ETHYL)-SUBSTITUTED BENZOFURANS

[75] Inventors: Graham Alwyn Fothergill, Knebworth; John Mervyn Osbond, Hatfield; James Charles Wickens, Saint Albans, all of England

[73] Assignee: Hoffmann-La Roche Inc., Nutley, N.J.

[22] Filed: Feb. 11, 1970

[21] Appl. No.: 10,645

Related U.S. Application Data

[63] Continuation-in-part of Ser. No. 547,176, May 3, 1966, abandoned.

[30] Foreign Application Priority Data

| May 11, 1965 | United Kingdom | 19823/65 |
| Dec. 15, 1965 | United Kingdom | 53208/65 |
| Mar. 18, 1966 | United Kingdom | 19823/66 |
| Dec. 15, 1965 | United Kingdom | 53209/65 |
| Dec. 15, 1965 | United Kingdom | 53210/65 |
| Feb. 4, 1966 | United Kingdom | 4931/66 |

[52] U.S. Cl. .......................... 260/346.2 R; 424/285
[51] Int. Cl.² .................................. C07D 307/80
[58] Field of Search ....................... 260/346.2 R

[56] References Cited
UNITED STATES PATENTS
3,371,100   2/1968   Howe et al. .................. 260/346.2

FOREIGN PATENTS OR APPLICATIONS
663,926   11/1965   Belgium

OTHER PUBLICATIONS
Burger et al., J. Am. Chem. Soc. (1945) Vol. 67, pp. 566–569.

*Primary Examiner*—Henry R. Miles
*Assistant Examiner*—Bernard I. Dentz
*Attorney, Agent, or Firm*—Samuel L. Welt; Jon S. Saxe; George M. Gould

[57] ABSTRACT

This disclosure relates to 2-(2-lower alkylamino-1-hydroxyethyl)-substituted benzofurans. Specifically, such compounds having lower alkyl substituents on the benzene ring and an isopropyl or tertiary butyl group on the side chain amino group are described. These compounds are useful as adrenergic blocking agents ($\beta$-type effects). Intermediates useful in the preparation of such compounds are also included.

6 Claims, No Drawings

2-(2-LOWER ALKYLAMINO-1-HYDROXY-ETHYL)-SUBSTITUTED BENZOFURANS

RELATED APPLICATIONS

This application is a continuation-in-part of co-pending U.S. patent application Ser. No. 547,176, filed May 3, 1966, now abandoned.

DETAILED DESCRIPTION OF THE INVENTION

The present invention relates to novel products useful for pharmaceutical purposes, novel intermediates useful in the preparation of such novel products and novel processes for preparing the foregoing.

More specifically, the present invention relates to novel benzofurans useful for pharmaceutical purposes by virtue of their pharmacological activity, to novel processes for preparing the latter and to novel benzofuran intermediates useful in such processes.

The novel benzofuran derivatives useful as pharmaceutical agents included within the purview of the present invention are selected from the group consisting of compounds of the formula

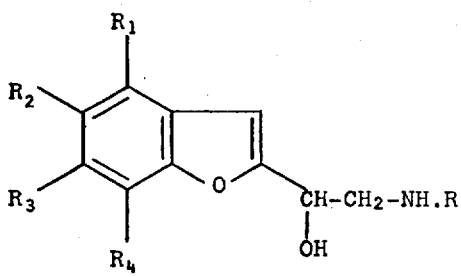

I wherein R is selected from the group consisting of lower alkyl; $R_1$ and $R_3$ are selected from the group consisting of hydrogen and lower alkyl; and $R_2$ and $R_4$ are selected from the group consisting of hydrogen, halogen, lower alkyl and allyl, at least one of $R_1$, $R_2$, $R_3$ and $R_4$ being other than hydrogen or halogen;
compounds of the formula

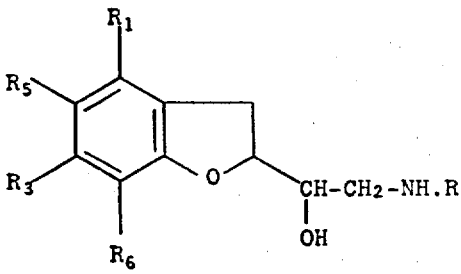

Ia wherein R is selected from the group consisting of lower alkyl and $R_1$, $R_3$, $R_5$ and $R_6$ are each selected from the group consisting of hydrogen and lower alkyl, at least one of $R_1$, $R_3$, $R_5$ and $R_6$ being other than hydrogen
and acid addition salts of compounds of the Formula I and Ia above with pharmaceutically acceptable acids.

Compounds of the Formula I and Ia above are useful as adrenergic blocking agents ($\beta$-type effects). Preferred for this purpose are compounds of the Formula I above and particularly those compounds encompassed by the scope thereof wherein one member of $R_1$, $R_2$, $R_3$ and $R_4$ is lower alkyl, preferentially $R_4$ and most preferably ethyl, and the remaining groups are hydrogen or wherein two of $R_1$, $R_2$, $R_3$ and $R_4$ are lower alkyl, preferentially methyl and the other two of $R_1$, $R_2$, $R_3$ and $R_4$ are hydrogen. It is also within the scope of this invention to employ the optical antipodes of the aforesaid compounds. The most desired compound of this class is (-)-2-(2-tert.-butylamino-1-hydroxy-ethyl)-7-ethyl-benzofuran and its acid addition salts, e.g., its hydrochloride salt.

The term "lower alkyl" as utilized throughout the present disclosure is intended to designate a straight or branched chain hydrocarbon group having 1–7 carbon atoms in the chain, most preferably 1–4 carbon atoms in the chain. Representative are methyl, ethyl, isopropyl, tertiary butyl and the like. The term "halogen" is intended to connote all four forms thereof, iodine, chlorine, fluorine and bromine unless otherwise specified. Especially preferred among the members of the halogen family are chlorine and bromine.

An advantageous class of compounds included within the purview of the present invention are those of Formula I above wherein at least one and, at the most, three of $R_1$, $R_2$, $R_3$ and $R_4$ are lower alkyl, most suitably, methyl, and the remainder are all hydrogen. Also preferred for the purposes of the present invention are those compounds of the Formula I and Ia above wherein the terminal lower alkyl amino group (R) is isopropylamino or tertiary butylamino. Still more preferably are compounds of the Formula I above wherein two of $R_1$, $R_2$, $R_3$ and $R_4$ are lower alkyl, preferentially methyl and the other two are hydrogen. Most preferred are compounds of the Formula I above wherein $R_1$ and $R_2$ are both hydrogen, $R_3$ and $R_4$ are both lower alkyl, most preferentially, methyl and the character R designates isopropyl. Advantageously when $R_2$ or $R_4$ is allyl, the other of $R_2$ or $R_4$ is other than halogen. Furthermore, when $R_2$ or $R_4$ is halogen, the other of $R_2$ and $R_4$ is other than allyl in accordance with a preferred embodiment. A further preferred class of compounds is obtained when one of $R_1$, $R_2$, $R_3$ and $R_4$ is ethyl, most preferably when $R_4$ is ethyl, the remaining groups are hydrogen and the character R designates tertiary butyl.

The novel compounds of the Formulas I and Ia above can be prepared utilizing a wide variety of reaction routes. In one such preparative technique, a compound of the Formula I above is obtained by reducing the ketone group of a halo-ketone of the formula

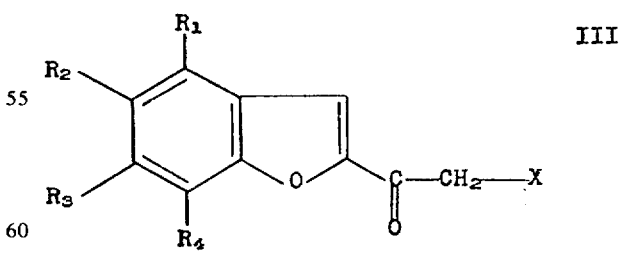

III wherein $R_1$, $R_2$, $R_3$ and $R_4$ are as above and X is selected from the group consisting of chlorine and bromine
with a reducing system which is capable of reducing the ketone grouping but which does not affect the other reducible entities of the molecule whereby to prepare a halohydrin of the formula

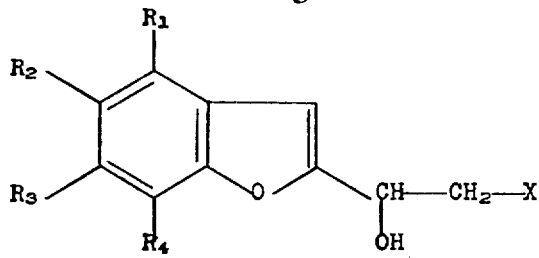

IV wherein $R_1$, $R_2$, $R_3$, $R_4$ and X are as above
and reacting the so-formed halohydrin of the Formula IV above with an amine of the formula $$R-NH_2 \qquad V$$

wherein R has the same meaning as ascribed thereto hereinabove in the presence of an acid acceptor whereby to prepare a compound of the Formula I above.

The so-prepared compound of the Formula I above can be converted into the corresponding compound of the Formula Ia above via reduction of the former with any suitable reducing system capable of effecting the desired end. Suitable reducing systems will be made particularly evident hereinafter.

Another reaction route leading to the compounds of the Formula I above involves dehydrohalogenating the halohydrin of the Formula IV above whereby to prepare the corresponding epoxide of the formula

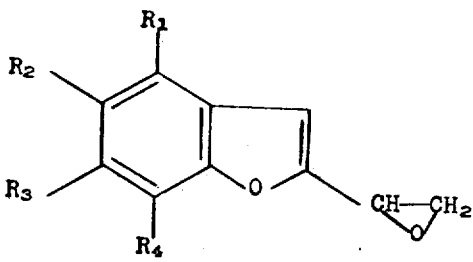

VI wherein $R_1$, $R_2$, $R_3$ and $R_4$ are as above
and then reacting this epoxide with an appropriate amine of the Formula V above whereby to prepare the corresponding compound of the Formula I above.

The processes broadly described hereinabove are illustrated graphically in the following diagrammatic flow sheet, wherein the symbols X, R, $R_1$, $R_2$, $R_3$, $R_4$, $R_5$ and $R_6$ have the same significance as ascribed thereto hereinabove.

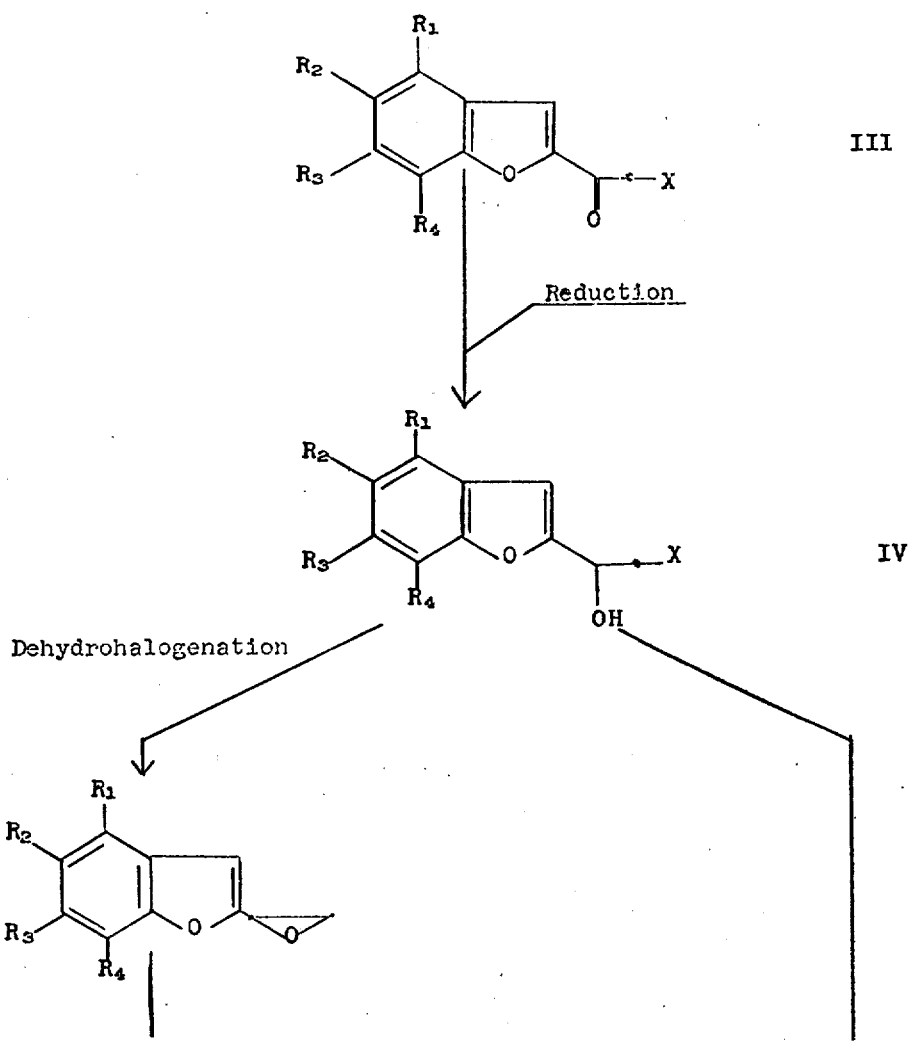

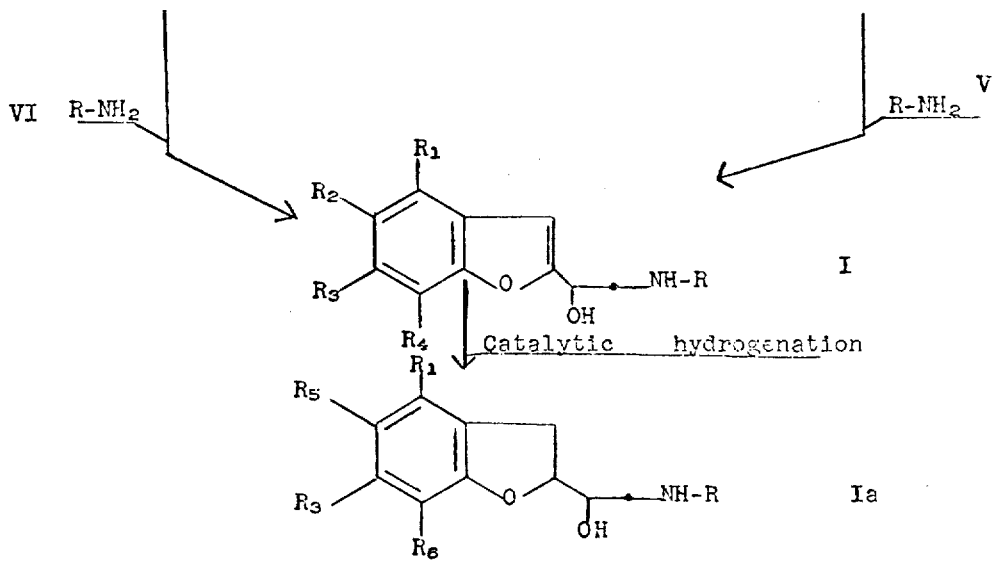

The haloketone starting material of the Formula III above can be obtained by a preparative technique which involves converting the appropriately substituted salicylaldehyde of the formula

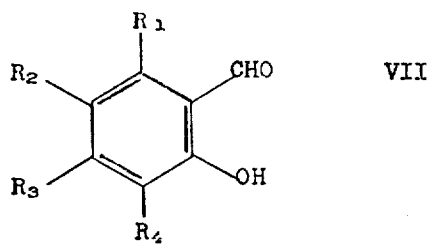

wherein $R_1$, $R_2$, $R_3$ and $R_4$ have the same meanings as above into an alkali-metal salt thereof by treating same with a suitable base, e.g. potassium hydroxide and the like, in the presence of a lower alkanol, e.g., ethanol; thereafter reacting the so-formed alkali metal salt with chloroacetone whereby to prepare a 2-acetyl-benzofuran of the formula

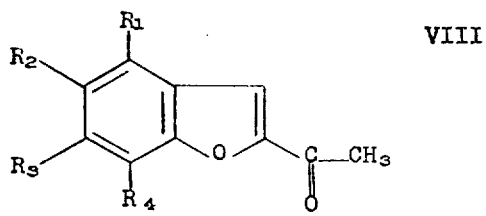

wherein $R_1$, $R_2$, $R_3$ and $R_4$ are as above and finally chlorinating or brominating the resulting last-mentioned compound whereby to prepare a compound of the Formula III above.

Salicylaldehydes of Formula VII above wherein $R_2$ and/or $R_4$ are allyl, can be obtained, for example, by converting the corresponding salicylaldehyde in which allyl groups are absent into its allyl ether and subjecting the so-formed ether to a CLAISEN rearrangement or by reacting an appropriately substituted phenol with dichloromethylmethyl ether and titanium tetrachloride in methylene chloride or using hexamethylenetetramine under the conditions of a DUFF reaction in a manner well known in the art.

Salicylaldehydes of the Formula VII above wherein $R_2$ and/or $R_4$ are halogen can be obtained by chlorinating or brominating a lower alkyl-substituted phenol by passing gaseous chlorine or bromine through a solution of the phenol in an inert organic solvent (e.g. chloroform or acetic acid) at a temperature of from about 0°C to 20°C. The transformation of the chlorination or bromination product into the corresponding substituted-salicylaldehyde can be carried out in accordance with methods known in the art; for example, using dichloromethyl methyl ether and titanium tetrachloride in methylene chloride or using hexamethylene-tetramine under the conditions of a DUFF reaction.

The conversion of compounds of the Formula VIII above to the corresponding compounds of the Formula III above is conveniently carried out by treating a compound of the Formula VIII above with any chlorinating or brominating agent capable of effecting this end. For example, compounds of the formula III above wherein X is chlorine are obtained by treating the corresponding compound of the Formula VIII above with sulphuryl chloride. Compounds of the Formula III above wherein X is bromine can be obtained by brominating the corresponding compound of the Formula VIII above with, for example, bromine, in an inert organic solvent such as ether or cupric bromide in ethyl acetate/chloroform. Especially useful halo-ketone starting materials for the purposes of the present invention are 2-chloroacetyl-5,6-dimethyl-benzofuran; 2-chloroacetyl-6,7-dimethyl-benzofuran; 2-chloroacetyl-4,6-dimethyl-benzofuran; 2-chloroacetyl-5,7-dimethyl-benzofuran; 5-bromo-2-bromoacetyl-7-ethyl-benzofuran; and 2-chloroacetyl-6-methyl-benzofuran.

In effecting the reduction of the haloketone of the Formula III above to the corresponding compound of the formula IV above, as is noted above, there is utilized a reducing system which will reduce the ketone group but will not effect the other reducible groups present in the benzofuran molecule, i.e., the 2,3-double bond or allyl, if present. Preferred for this purpose are alkali-metal borohydride reducing agents, e.g., lithium borohydride, potassium borohydride, or most preferably, sodium borohydride. Preferably, an organic solvent such as a lower alkanol, e.g., ethanol, or aqueous dioxane is employed as the reaction medium and the haloketone is advantageously dissolved therein prior to the addition of the reducing agent, e.g. the borohydride. It will be apparent to those skilled in the art that other solvents which are inert under the reduction conditions employed in this process step can also be efficaciously utilized as the reaction medium. Suitably, the reduction of the halo-ketone of the Formula III above with a borohydride is carried out at a temperature of less than 20°C. Representative of other reducing agents useable in this process step is aluminum isopropoxide, preferentially provided in a solvent medium, such as isopropanol. The reduction utilizing aluminum isopropoxide in isopropanol is advantageously carried out at elevated temperatures.

The conversion of the halohydrin of the Formula IV above to the corresponding compound of the Formula I above utilizing the compound of the formula $R-NH_2$ (Formula V) is effected by treating the halohydrin with at least 1 mol. of the amine at elevated temperatures, (most preferably, at a temperature of from about 50° to about 100°C.) in the presence of a suitable acid acceptor. By utilizing an excess of the amine, a two fold-purpose can be served; namely the provision with this single material of an acid acceptor and reactant. In a preferred aspect, the acid acceptor is provided accordingly. However, any suitable acid binding agent which is capable of performing the functions ascribed thereto in the instant disclosure is contemplated within the purview of the present invention. Illustrative of suitable acid acceptors are pyridine, alkali metal carbonates, e.g. sodium carbonate and the like. The conversion of the compounds of the Formula IV above to the compounds of the Formula I above in a preferred process aspect is carried out using at least 2 moles of the amine of the Formula V above for each 1 mole of halohydrin of the Formula IV above present in the reaction zone. Suitably, the reaction is carried out in an inert organic solvent such as ethanol, but an inert organic solvent is not necessary for a successful performance of this process step except, where its presence is required to assure solution of the acid acceptor. It should be apparent to those skilled in the art that when the compound of the Formula V above is a volatile amine, the treatment of the compounds of Formula IV above with such an amine preferentially should take place in a closed vessel. While isopropylamine is preferred, it is, of course, to be understood that other amines of the Formula V above such as isobutylamine is also useable in preparing the compounds of Formula I above.

In proceeding along the alternate route illustrated diagrammatically above (IV → VI → I), the dehydrohalogenation of the halohydrin of the Formula IV above to the corresponding epoxide of the Formula VI above proceeds preferably, at room temperature, in the presence of a suitable base such as an alkali-metal hydroxide, e.g. potassium hydroxide, in solution in a suitable solublizing medium, preferably, a lower alkanol, most advantageously methanol or alternatively suspended in a non-polar organic solvent such as an aromatic hydrocarbon, e.g. benzene, and the like.

The conversion of the epoxide of the Formula VI above to the corresponding compound of the Formula I above utilizing the amine of the Formula V above can be carried out by treating same at an elevated temperature, most preferentially, at a temperature of from about 50° to about 100°C. In this process step, an excess of the amine is advantageously employed whereby the excess can serve as the reaction medium. Alternatively, the reaction can be conducted in an inert organic solvent, such as benzene, at room temperature in the presence of an aprotic Lewis acid, for example, boron trifluoride and the like. Most suitably, borontrifluoride in the form of its etherate, i.e. boron trifluoride etherate, is utilized in this process step.

As is evident from the above, the product obtained by the preparative techniques described hereinabove may be chemically identified as 2-[2-(lower alkyl)-amino-1-hydroxyethyl]benzofurans (i.e. compounds of the Formula I above) which have a double bond in the 2,3-position. When proceeding accordingly, it has been observed that there is also prepared as a by-product, the corresponding 2-[1-(lower alkyl)amino-2-hydroxyethyl]-benzofuran. This by-product can be separated from the desired end product utilizing any conventional procedure capable of effecting this end, e.g. by chromatography on alumina or by fractional recrystallization of the compound of the Formula I above, either in its base form or as acid addition salts.

Compounds of the Formula Ia above can be prepared from the corresponding compounds of the Formula I above by reduction of the latter. Such reduction is achieved by hydrogenating in the presence of a suitable hydrogenation catalyst such as palladium-on-charcoal at room temperature and atmospheric pressure.

Compounds of the Formula I above wherein $R_2$ and/or $R_4$ represent hydrogen can be further prepared from the corresponding compounds of the Formula I above wherein $R_2$ and/or $R_4$ represent halogen by catalytically hydrogenating the last-mentioned compounds.

For example, the catalytic hydrogenation of compounds of the Formula I above wherein $R_2$ and/or $R_4$ is halogen to the corresponding compounds of the Formula I wherein $R_2$ and/or $R_4$ is hydrogen is preferably effected in the presence of a palladium catalyst, e.g. palladium-on-carbon at room temperature and atmospheric pressure. The hydrogenation may also be carried out conveniently in an alkaline medium, e.g. an alkali metal hydroxide such as potassium hydroxide disposed in a lower alkanol, e.g. methanol, at atmospheric pressure and room temperature. When proceeding accordingly, the removal of the chlorine and/or bromine atoms proceeds quite facilely and a noticeable drop in hydrogen absorption is readily ascertainable when such removal is substantially completed. At this point, if desired, the substantially dehalogenated 2,3-dehydro benzofuran can be isolated. However, the catalytic hydrogenation can be continued (i.e., after the noticeable drop in hydrogen absorption occurs after the chlorine and/or bromine atoms have been removed from the benzofuran nucleus) whereby the corresponding 2,3-dihydro benzofurans of the Formula Ia above, (i.e. benzofurans bearing hydrogen in positions 5 and/or 7) are obtained. The addition of hydrogen across the double bond in positions 2, 3 is much less favored than the dehalogenation and accordingly proceeds at an appreciably slower rate. Thus, substantial dehalogenation is effected before any significant reduction of the double bond occurs.

Especially interesting halogen-containing materials for the purposes of the present invention are 5-bromo-2-(2-isopropylamino-1-hydroxyethyl)-6,7-dimethyl-benzofuran, 5-bromo-2-(2-isopropylamino-1-hydroxyethyl)-7-methyl-benzofuran, 7-bromo-2-(2-isopropylamino-1-hydroxyethyl)-5-methyl-benzofuran, 5,7-dibromo-2-(2-isopropylamino-1-hydroxyethyl)-4-methyl-benzofuran and 5-bromo-2-(2-isopropylamino-1-hydroxyethyl)-7-ethyl-benzofuran.

Compounds of the Formula I above wherein $R_2$ and/or $R_4$ represents allyl can be converted into the corresponding compounds of the Formula I above or the formula Ia above wherein $R_2$ and/or $R_4$ represent propyl (e.g. allyl → propyl) by catalytically hydrogenating compounds of the formula I above wherein $R_2$ and/or $R_4$ is allyl.

The catalytic hydrogenation is advantageously effected utilizing hydrogen in the presence of a palladium catalyst (e.g. palladium-carbon) at room temperature and atmospheric pressure. When proceeding accordingly, the catalytic hydrogenation is rapid at first as with halogen-containing compounds and results in reduction of the allyl group in the 5- and/or 7-positions to a propyl group. The hydrogenation can be terminated when reduction of the allyl group has been substantially completed and the resulting lower alkyl-substituted-2,3-dehydro compounds of the formula I above, isolated if desired. However, the catalytic hydrogenation can be permitted to proceed until reduction of the 2,3-double bond of the formula I above is achieved whereby to obtain compounds of the formula Ia above. The reduction of the allyl group proceeds much more readily than the reduction of the ethylenic 2,3-double bond and thus is substantially completed before any significant addition of hydrogen across the 2,3-double bond occurs.

Particularly advantageous allyl-containing compounds for the purposes of the present invention are 2-(2-isopropylamino-1-hydroxyethyl)-7-allyl-benzofuran, 2-(2-isopropylamino-1-hydroxyethyl)-6-methyl-7-allyl-benzofuran and 2-(2-isopropylamino-1-hydroxyethyl)-5,7-diallyl-benzofuran.

It will be readily recognized by those skilled in the art that compounds of the formula I above contain an asymmetrical carbon atom and hence, occur in the form of a stereoisomeric racemate. It will be further appreciated that compounds of the formula Ia above contain two asymmetrical carbon atoms and hence, occur in the form of two stereoisomeric racemates. The foregoing racemates can, if desired, be separated into their optical isomers according to procedures well established in the art, for example, by fractional crystallization of the salts.

As is evident from the above, the compounds of Formula I and Ia above form acid addition salts with pharmaceutically acceptable acids, for example, with inorganic acids, such as hydrochloric acid, hydrobromic acid, sulphuric acid and phosphoric acid and with organic acids such as acetic acid, tartaric acid, maleic acid, citric acid and toluene sulfonic acid.

The compounds of the formula I above and the non-toxic salts thereof with pharmaceutically acceptable acids, as indicated above, are useful as adrenergic blocking agents [beta-type effects]. The novel pharmaceutically valuable agents provided by the present invention can be administered in pharmaceutical dosage forms, internally, for example, parenterally or enterally with dosage adjusted to fit the exigencies of the therapeutic situation. The pharmaceutical dosage forms may be prepared by incorporating the active ingredient in conventional liquid or solid vehicles to thereby provide elixirs, emulsions, suspensions, tablets, capsules, powders and the like according to acceptable pharmaceutical practices. The carrier or diluents may be talc (inorganic), lactose or starch (organic), water, petroleum jelly and the like. A lubricant such as magnesium stearate may also be present. As suspending agents, vegetable oils and polyoxyethylene glycols can be used. Emulsifying agents, dispersing agents and other pharmaceutically acceptable adjuvants may also be incorporated, if necessary, in the pharmaceutical dosage forms.

The following examples are illustrative but not limitative of the present application. All temperatures are stated in degrees Centigrade.

EXAMPLE 1

A. The preparation of the starting material

A solution of 18.3 g. of potassium hydroxide in 150 ml. of ethanol was carefully added with stirring over a period of 15 minutes to a solution of 45 g. (0.3 mol) of 4,5-dimethylsalicylaldehyde in 200 ml. of ethanol, yielding a yellow precipitate of the potassium salt of 4,5-dimethylsalicylaldehyde. 24.15 Ml. (27.8 g., 0.3 mol) of chloroacetone were added with stirring for an additional period of 15 minutes. The internal temperature rose to 40°. The mixture was stirred at 20° for an additional 20 hours, during which time a fine white precipitate formed. 350 Ml. of water were added to the reaction mixture and the ethanol was removed under reduced pressure. The residue was extracted three times with ether, the extracts were washed once with water and were dried over sodium sulphate. The dried solution was filtered, evaporated to a syrup and distilled to a main fraction of boiling point 120°–145°/0.7 mm. The distillate was crystallized from petroleum (boiling range 60°–80°) to give 2-acetyl-5,6-dimethyl-benzofuran as white prisms of melting point 85°–88°. Further crops were contaminated with 4,5-dimethyl-salicylaldehyde and were freed from this by washing in ethereal solution with 2N sodium hydroxide solution and by recrystallization. Additional 2-acetyl-5,6-dimethyl-benzofuran, of melting point 79°–85° were obtained accordingly. 8.8 Ml. (14.64 g., 0.1085 mol) of sulfuryl chloride were carefully added with stirring over a period of 15 minutes to a solution of 17 g. (0.904 mol) of 2-acetyl-5,6-dimethyl-benzofuran in 90 ml. of chloroform. The mixture was slowly warmed to reflux over 20 minutes and then heated under gentle reflux for 150 minutes. The reaction mixture was cooled and poured into ice-water. The organic and aqueous phases were separated and the aqueous layer was extracted twice with chloroform. The extracts were combined with the organic phase, the resulting medium was washed twice with 2N sodium carbonate and then with water and dried over sodium sulfate. The dried solution was filtered, the filtrate was evaporated and the residue was crystallized from ethanol to give 2-chloroacetyl-5,6-dimethyl-benzofuran in the form of buff needles of melting point 115°–120°.

17 g. (0.076 mol) of 2-chloroacetyl-5,6-dimethyl-benzofuran were dissolved in 100 ml. of dioxane. The solution was cooled and treated with 18 ml. of water. 1.80 g. (0.048 mol) of sodium borohydride were added portionwise over 30 minutes with stirring and cooling with ice. The resultant reaction mixture was stirred for 2 hours at 20°, after which time the solvent was removed at 40° under reduced pressure. 100 ml. of water were added and the solution was extracted three times with ether. The ether solutions were washed once with water, dried and evaporated to yield 2-(2-chloro-1- hydroxyethyl)-5,6-dimethyl-benzofuran in the form of an orange syrup.

A solution of 15 g. (0.066 mol) of 2-(2-chloro-1-hydroxyethyl)-5,6-dimethyl-benzofuran and 12 g. (0.2 mol) of isopropyl amine in 40 ml. of ethanol was heated under reflux for 18 hours. The solvent and the excess isopropyl amine were removed under reduced pressure and the residual syrup was dissolved in ether. The ethereal solution was treated with aqueous 2N potassium hydroxide solution and the resulting aqueous layer was reextracted with ether. The combined ether solutions were washed with water and dried over anhydrous sodium sulfate. The dried solution was filtered and the filtrate was evaporated to yield a syrup consisting of 2-(2-isopropylamino-1-hydroxyethyl)-5,6-dimethyl-benzofuran and the isomeric 2-(1-isopropylamino-2-hydroxy-ethyl)-5,6-dimethyl-benzofuran. The syrup was converted into the hydrochloride and crystallized, yielding 2-(2-isopropylamino-1-hydroxyethyl)-5,6-dimethyl-benzofuran hydrochloride of melting point 168°–171°.

EXAMPLE 2

A solution of ca 18.5 g. of 2-(2-chloro-1-hydroxyethyl)-5,6-dimethyl-benzofuran in 50 ml. of benzene was added with ice-cooling over 30 minutes to a stirred suspension of 14 g. of powdered potassium hydroxide in 25 ml. of benzene. The mixture was stirred for 2½ hours at 0°–10°, diluted with 25 ml. of benzene and filtered through diatomaceous earth. The filtrate was washed with water until neutral and dried over anhydrous sodium sulfate. The dried solution was filtered and evaporated. Upon distillation of the residue, 2-epoxyethyl-5,6-dimethyl-benzofuran as a yellow syrup/cream solid of boiling point 120°/0.25 mm, was obtained.

EXAMPLE 3

A solution of 6.4 g. (0.034 mol) of 2-epoxyethyl-5,6-dimethyl-benzofuran and 4.02 g. (0.068 mol) of isopropyl amine in 25 ml. of benzene was treated with 10 drops of boron trifluoride etherate. The so-treated reaction medium was allowed to stand at 20° for 136 hours. 2-(2-isopropyl-amino-1-hydroxyethyl)-5,6-dimethyl-benzofuran separated as a white solid. The product was filtered off and converted into the hydrochloride. Crystallization from methanol/ether gave 2-(2-isopropylamino-1-hydroxyethyl)-5,6-dimethyl-benzofuran hydrochloride in the form of colorless prisms of melting point 175°–177°.

The reaction mother liquors were concentrated to a syrup consisting of the isomeric product, 2-(1-isopropylamino-2-hydroxyethyl)-5,6-dimethyl-benzofuran. The syrup yielded the crude hydrochloride and several recrystallizations of this byproduct yielded pure 2-(1-isopropylamino-2-hydroxyethyl)-5,6-dimethyl-benzofuran hydrochloride of melting point 216°–219°.

EXAMPLE 4

A solution of 1.42 g. (0.005 mol) of 2-(2-isopropylamino-1-hydroxyethyl)-5,6-dimethyl-benzofuran hydrochloride in 20 ml. of methanol was hydrogenated at 20° and at atmospheric pressure in the presence of 0.5 g. of 5 percent palladium-on-charcoal catalyst. After uptake of hydrogen, the solution was filtered and the filtrate concentrated. Treatment with ether gave the diastereoisomeric mixture of 2-(2-isopropylamino-1-hydroxyethyl)-5,6-dimethyl-2,3-dihydro-benzofuran hydrochloride in the form of colorless prisms. Fractional crystallization from ethanol/ether gave two racemates, one having a melting point of 219° and the other having a melting point of 173° – 175°.

EXAMPLE 5

11.22 g. (0.05 mol) of 2-(2-chloro-1-hydroxyethyl)-5,6-dimethyl-benzofuran and 22 g. (0.3 mol) of isobutyl amine were dissolved in 75 ml. of isopropanol. The solution was heated under reflux for 24 hours, then evaporated on a water-bath at 50° under a pressure of 15 mm. The residual syrup was treated with 2-N ethereal hydrogen chloride and the precipitate which formed was filtered off and crystallized from ethanol to give 2-(2-isobutylamino-1-hydroxyethyl)-5,6-dimethyl-benzofuran hydrochloride in the form of colorless prisms of melting point 192°–193°.

EXAMPLE 6

A solution of 18.3 g. of potassium hydroxide in 150 ml. of ethanol was carefully added with stirring under nitrogen over a period of 15 minutes to a solution of 45 g. (0.3 mol) of 4,6-dimethyl-salicylaldehyde in 200 ml. of ethanol. A yellow precipitate of the potassium salt formed. 28.9 ml. (33.3 g., 0.36 mol) of chloro-acetone were added dropwise with stirring over 30 minutes, during which the internal temperature rose to 40°. The mixture was stirred at 20° in a nitrogen atmosphere for a further 19 hours. After this time, 350 ml. of water were added and the ethanol was removed under reduced pressure. The residue was extracted three times with chloroform and the organic layers were washed once with water and dried over anhydrous sodium sulphate. The dried solution was filtered and the filtrate evaporated to a syrup. This was distilled giving a main fraction of boiling point 120° – 135°/1.2 mm. Upon the addition of petroleum to this fraction, 2-acetyl-4,6-dimethyl-benzofuran having a melting point of 94°–96° crystallized.

12.6 ml. (0.17 mol) of sulphuryl chloride were carefully added with stirring over a period of 15 minutes to a solution of 25 g. (0.133 mol) of 2-acetyl-4,6-dimethyl-benzofuran in 130 ml. of chloroform. The reaction mixture was slowly warmed to reflux over a period of 15 minutes and was then heated under gentle reflux for 2½ hours. The reaction mixture was cooled and poured into 200 ml. of ice-water. The organic layer was separated and the aqueous layer extracted twice with chloroform. The chloroform extracts were combined with the organic layer. The resultant combined medium was washed once with water and dried over sodium sulphate. The dried solution was filtered and the filtrate evaporated to yield 2-chloroacetyl-4,6-dimethyl-benzofuran as a pink solid which after crystallization from ethanol melted at 121°–124°.

23 g. (0.103 mol) of 2-Chloroacetyl-4,6-dimethyl-benzofuran were dissolved in 150 ml. of dioxane. The solution was treated with 23 ml. of water and 2.45 g. (0.06 mol) of sodium borohydride were added portionwise over 30 minutes while cooling with ice. The reaction mixture was stirred for 2¾ hours at 20° and the solvent was then removed under reduced pressure at 40°. 250 ml. of water were added to the residue and the mixture was extracted three times with ether. The ether extracts were combined, washed once with water and dried over anhydrous sodium sulphate. The dried solution was filtered and the filtrate was evaporated to give 2-(2-chloro-1-hydroxyethyl)-4,6-dimethyl-benzofuran in the form of a buff colored oil.

11.15 g. (0.05 mol) of 2-(2-chloro-1-hydroxyethyl)-

4,6-dimethyl-benzofuran and 45 g. (0.75 mol) of isopropylamine were sealed in a steel autoclave and heated at 80° for 10 hours. The cooled reaction mixture was dissolved in dilute hydrochloric acid and the solution extracted twice with ether. The aqueous solution was made alkaline with potassium hydroxide and extracted three times with ether. The ether extracts were combined, washed with water, dried over anhydrous sodium sulphate, filtered and the filtrate evaporated to give a syrup. The syrup was dissolved in methanol and the solution was treated with ethereal hydrogen chloride and ether to give a crystalline precipitate of melting point 180° – 190°. Recrystallization of this precipitate from ethyl acetate, ethanol and ether gave what proved to be an isomer, 2-(1-isopropylamino-2-hydroxy-ethyl)-4,6-dimethyl-benzofuran hydrochloride having a melting point of 193°–194°. The hydrochloride mother liquors were concentrated to a syrup which was treated with potassium hydroxide solution. The so-treated solution was extracted with ether (3X) and the combined ether solutions were washed with water, dried over anhydrous sodium sulphate and evaporated to a syrup. Crystallization from a mixture of petroleum (boiling range = 60°–80°) and benzene gave buff-colored needles of melting point 100°–102° of 2-(2-isopropylamino-1-hydroxyethyl)-4,6-dimethyl-benzofuran. The product was converted into its hydrochloride by treatment thereof with ethyl acetate, ethereal hydrogen chloride and ether. The hydrochloride was recrystallized from ethyl acetate/ether to give cream prisms of melting point 139°–141°.

EXAMPLE 7

A solution of 128.1 g. of potassium hydroxide in 1050 ml. of ethanol was added dropwise the stirring over 15 minutes in an atmosphere of nitrogen to a solution of 303 g. (2.02 mol) of 3,5-dimethyl-salicylaldehyde in 1500 ml. of ethanol. 218.7 ml. (251.5 g., 2.72 mol) of chloroacetone were then added dropwise with stirring over ¾ of an hour while a gentle exothermic reaction occurred. The mixture was stirred at 20° in a nitrogen atmosphere for a further 3 hours, and after this time was stored at 0° for 48 hours. The crystalline solid which separated out was filtered off, washed several times with water and dried. Crystallization of the so-treated solid from petroleum (boiling range = 60°–80°) gave 2-acetyl-5,7-dimethyl-benzofuran of melting point 76°–79°. The mother liquors were concentrated and the residue was distilled (boiling point 140°–145°/0.5 mm) and the distillate was crystallized from petroleum (boiling range = 60°–80°) to give more of the product.

102 Ml. (170 g. 1.27 mol) of sulphuryl chloride were added dropwise with stirring over 15 minutes to a solution of 200 g. (1.06 mol) of 2-acetyl-5,7-dimethyl-benzofuran in 1,200 ml. of chloroform. The reaction mixture was slowly warmed to the reflux temperature and was maintained at reflux for 2½ hours. The cooled reaction mixture was poured into 2,000 ml. of ice-water and the organic and aqueous phases were separated. The aqueous layer was extracted twice with chloroform and the chloroform extracts were combined with the organic phase. The medium resulting from the combination was washed once and dried over anhydrous sodium sulphate. The dried solution was filtered and the filtrate was evaporated. The solid residue was crystallized from ethanol to give 2-chloroacetyl-5,7-dimethyl-benzofuran of melting point 97°–107°.

EXAMPLE 8

167 g. (0.75 mol) of 2-chloroacetyl-5,7-dimethyl-benzofuran were dissolved in 750 ml. of dioxane. The cooled solution was treated with 180 ml. of water and 17.5 g. of sodium borohydride were added portionwise with stirring over 1 hour while cooling with ice. The reaction mixture was stirred for 2 hours at 20° and the solvent was then removed under reduced pressure at 40°. 750 ml. of water were added to the residue and the aqueous solution was extracted three times with ether. The ether solutions were combined, washed with water, dried over anhydrous sodium sulphate and filtered. The filtrate was evaporated to give 2-(2-chloro-1-hydroxyethyl)-5,7-dimethyl-benzofuran as a syrup.

EXAMPLE 9

A solution of ca 190 g. of 2-(2-chloro-1-hydroxyethyl)-5,7-dimethyl-benzofuran in 300 ml. of dry benzene was added over 30 minutes while cooling with ice to a stirred suspension of 120 g. of powdered potassium hydroxide in 300 ml. of dry benzene. The mixture was stirred for 2½ hours at 0°–10° and was then poured into 3,000 ml. of ice-water. The benzene layer was separated and the aqueous layer was extracted with benzene. The benzene extract was washed with four 500 ml. portions of water until neutral and then were dried over anhydrous sodium sulphate. The dried solution was filtered and the filtrate was evaporated under reduced pressure on a steam-bath at 40°. The main fractions (boiling point 140°/0.2 mm) yielded 2-epoxyethyl-5,7-dimethyl-benzofuran as a yellow syrup.

A solution of 18.8 g. (0.1 mol) of 2-epoxyethyl-5,7-dimethyl-benzofuran and 11.8 g. (0.2 mol) of isopropyl amine in 50 ml. of benzene was treated with 10 drops of boron trifluoride etherate and the mixture was allowed to stand for 72 hours at 20°. After this time, the mixture was evaporated to a syrup which was converted into the hydrochloride; crystallization did not occur. The solution of hydrochloride obtained was evaporated to a syrup and the so-formed syrup was dissolved in ether. The ether solution was extracted three times with water, and the aqueous extracts were made alkaline with 2-N sodium hydroxide solution. The so-formed medium was extracted three times with ether. The extracts were combined, dried over anhydrous sodium sulphate and the dried solution was filtered. The filtrate was evaporated to give a syrup. Upon crystallization of the syrup from ethyl acetate, prisms were obtained. Recrystallization of the prisms from ethyl acetate gave pure 2-(2-isopropylamino-1-hydroxyethyl)-5,7-dimethyl-benzofuran of melting point 99°–100°. When dissolved in ethyl acetate and treated with ethereal hydrogen chloride, the free base gave a crystalline hydrochloride of melting point 160°. The mother liquors from the crystallization of crude bases were treated with ethereal hydrogen chloride and gave crystalline 2-(1-isopropylamino-2-hydroxyethyl)-5,7-dimethyl-benzofuran hydrochloride of melting point 197°–198°.

EXAMPLE 10

A solution of 6.2 g. of potassium hydroxide in 50 ml. of ethanol was added over 10 minutes to a stirred solution of 13.6 g. (0.1 mol) of 4-methyl-salicylaldehyde in 70 ml. of dry ethanol. 9.6 g. (0.1 mol) of chloroacetone were carefully added over 10 minutes to the suspension of the yellow potassium salt which was thus formed.

There was no appreciable rise in the temperature of the reaction mixture during the addition. Stirring was continued for 20 hours at room temperature and ca 200 ml. of water were then added. The mixture was extracted three times with chloroform, the chloroform extracts were combined, washed once with water, dried over sodium sulphate and the dried solution was filtered. The solvent was removed by evaporation and the residual oil was distilled to give a main fraction boiling at 96°–102°/0.2 mm. After crystallization from ethanol, white prisms of 2-acetyl-6-methyl-benzofuran of melting point 69°–71° were obtained.

8.1 g. (0.06 mol) of sulphuryl chloride were carefully added over 10 minutes to a stirred solution of 8.71 g. (0.05 mol) of 2-acetyl-6-methyl-benzofuran in 50 ml. of chloroform. The reaction mixture was slowly warmed to the reflux temperature and was then heated under gentle reflux for 2½ hours. The cooled reaction mixture was poured into 100 ml. of ice-water and the phases were separated. The aqueous layer was extracted twice with chloroform, the combined organic solutions were washed twice with sodium carbonate solution and once with water, and were then dried over anhydrous sodium sulphate. The dried solution was filtered, the chloroform was removed by evaporation and the residue was crystallized from ethanol to give grey, light-sensitive crystals of 2-chloroacetyl-6-methyl-benzofuran of melting point 114°–115°.

EXAMPLE 11

2.0 g. (0.05 mol) of sodium borohydride were added portion-wise over a period of 30 minutes to an ice-cooled stirred solution of 10.43 g. (0.05 mol) of 2-chloroacetyl-6-methyl-benzofuran in a mixture of 40 ml. of dioxane and 10 ml. of water. The mixture was stirred for a further 3 hours and was then allowed to stand at room temperature for an additional 20 hours. Thereafter, 100 ml. of water were added and the mixture was extracted twice with ether. The combined extracts were washed with water and then with brine, and dried over anhydrous sodium sulphate. The dried solution was filtered and the solvent removed by evaporation under reduced pressure to give 2-(2-chloro-1-hydroxyethyl)-6-methyl-benzofuran as a pale, yellow oil.

EXAMPLE 12

A solution of 11.0 g. (0.05 mol) of 2-(2-chloro-1-hydroxyethyl)-6-methyl-benzofuran and 12 g. (0.2 mol) of isopropyl amine in 50 ml. of ethanol was heated under reflux for 24 hours. The solvent and excess isopropylamine were removed by evaporation under reduced pressure. The residue was taken up in chloroform, the chloroform solution was washed twice with dilute sodium hydroxide solution, once with water and then dried over anhydrous sodium sulphate. The dried solution was filtered, the solvent removed by evaporation and the residual brown oil dissolved in ethanol. Ethanolic hydrogen chloride was added to this solution and solid 2-(2-isopropylamino-1-hydroxyethyl)-6-methyl-benzofuran hydrochloride was obtained. Crystallization from ethanol/ether gave a product melting at 182°. The isomeric 2-(1-isopropylamino-2-hydroxyethyl)-6-methyl-benzofuran hydrochloride of melting point 172°–173°C. was obtained from the mother liquors.

EXAMPLE 13

A solution of 30.5 g. of potassium hydroxide in 250 ml. of ethanol was carefully added with stirring over a period of 15 minutes to a solution of 75 g. (0.5 mol) of 3,4-dimethyl-salicylaldehyde in 350 ml. of ethanol, giving a yellow precipitate of the potassium salt. 40.25 ml. (46.25 g., 0.5 mol) of chloroacetone were added with stirring over a period of 45 minutes. During this addition, the temperature of the mixture rose from 25° to 40° and the yellow precipitate dissolved and a fine white precipitate appeared. The reaction mixture was stirred at 20° for a further 17 hours. After this time, 600 ml. of water were added, the ethanol was removed under reduced pressure and the residue was extracted three times with chloroform. The chloroform extracts were combined, washed once with water and dried over anhydrous sodium sulphate. The dried solution was filtered and the filtrate evaporated. The residue was distilled to yield a fore-run of boiling point 95°–110°/0.7 and a main fraction of boiling point 115°–130°/0.5–0.7 mm. The fore-run was contaminated with 3,4-dimethyl-salicylaldehyde. Both fractions were crystallized from petroleum (boiling range 60°–80°) to yield 2-acetyl-6,7-dimethyl-benzofuran of melting point 94.5°–96.5°.

19.4 ml. (27 g., 0.24 mol) of sulphuryl chloride were added dropwise with stirring over 10 minutes to a solution of 37.6 g. (0.2 mol) of 2-acetyl-6,7-dimethyl-benzofuran in 200 ml. of chloroform. The reaction mixture was warmed to gentle reflux over 30 minutes and was maintained at gentle reflux for a further 2½ hours. The reaction mixture was cooled and poured into 300 ml. of ice-water. The organic and aqueous phases were separated. The aqueous layer was extracted twice with chloroform and the chloroform extracts were combined with the organic phase. The medium obtained by such combination was washed twice with 2-N sodium carbonate solution, twice with water and then dried over sodium sulphate. Evaporation of the dried solutions yielded a solid crude 2-chloroacetyl-6,7-dimethyl-benzofuran. Crystallization from ethanol gave buff needles of melting point 105°–109°.

EXAMPLE 14

37 g. (0.166 mol) of 2-chloroacetyl-6,7-dimethyl-benzofuran were dissolved in 200 ml. of dioxane. The solution was cooled and treated with 40 ml. of water. 3.85 g. (0.104 mol) of sodium borohydride were added portionwise over 30 minutes while stirring and cooling with ice-water. The reaction mixture was stirred at 20° for 2 hours, after which time the dioxane was removed under reduced pressure at 40°. 300 ml. of water were added to the residue and the solution was extracted three times with ether. The organic layers were washed once with water and dried over anhydrous sodium sulphate. The solution was filtered and the filtrate was evaporated to yield 2-(2-chloro-1-hydroxyethyl)-6,7-dimethyl-benzofuran in the form of a yellow syrup.

EXAMPLE 15

A solution of 28 g. (0.126 mol) of 2-(2-chloro-1-hydroxyethyl)-6,7-dimethyl-benzofuran and 14.75 g. (0.25 mol) of isopropyl amine in 60 ml. of ethanol was heated under reflux for 60 hours. The reaction mixture was evaporated to a syrup and this was dissolved in ether. The solution was treated with 2-N sodium hydroxide solution and again extracted with ether. The ether extracts were combined, dried over sodium sulphate, filtered and the filtrate evaporated to a syrup. The syrup was dissolved in the minimum quanity of methanol and treated with ethereal hydrogen chloride and ether to give a crystalline hydrochloride. Recrystallization yielded 2-(2-isopropylamino-1-hydroxyethyl)-6,7-dimethyl-benzofuran hydrochloride of melting point 191°–193°. Subsequent crops were contaminated with the isomeric 2-(1-isopropylamino-2-hydroxyethyl)-6,7-dimethyl-benzofuran hydrochloride, which in a pure state melted at 190°–192° (by chromatography of the contaminated product on alumina.)

EXAMPLE 16

A solution of 13.5 g. (0.603 mol) of 2-(2-chloro-1-hydroxyethyl)-6,7-dimethyl-benzofuran in 50 ml. of benzene was added with ice-cooling over 30 minutes to a stirred suspension of 17.5 g. of powdered potassium hydroxide in 50 ml. of benzene. Stirring was continued for a further 3 hours while maintaining the temperature at 0°–5°. The reaction mixture was filtered through diatomaceous earth. The filtrate was washed with water until neutral and dried over anhydrous sodium sulphate. The dried solution was filtered and the filtrate was concentrated. The residue distilled to yield 2-epoxyethyl-6,7-dimethyl-benzofuran in the form of a yellow oil of boiling point 110°–115°/0.5 mm.

EXAMPLE 17

A solution of 4 g. of 2-epoxyethyl-6,7-dimethyl-benzofuran and 3 g. of isopropylamine in 20 ml. of benzene was treated with 10 drops of boron trifluoride etherate and the mixture was allowed to stand at 20° for 94 hours. After this time the mixture was evaporated to a syrup which was twice co-distilled with methanol and then dissolved in a small amount of methanol. The methanolic solution was treated with ethereal hydrogen chloride and ether to yield a crystalline hydrochloride of melting point 175°–180°, which consisted of the desired 2-(2-isopropylamino-1-hydroxyethyl)-6,7-dimethyl-benzofuran hydrochloride. Recrystallization from methanol/ether gave 2-(2-isopropylamino-1-hydroxyethyl)-6,7-dimethyl-benzofuran hydrochloride of melting point 187°–189.5°C.

EXAMPLE 18

A mixture of 50.25 g. (0.25 mol) of 4-bromo-2,3-xylenol, 18.75 g. of paraformaldehyde and 18.75 g. of hexamethylenetetramine was melted to a paste. 75 ml. of glacial acetic acid were added to the stirred mixture over a period of 1 hour, the internal temperature being maintained at 100° (bath temperature 125°). 20.4 ml. of concentrated sulphuric acid were than added dropwise over a period of 2 hours, the internal temperature being maintained at 118°–120° (bath temperature 140°). After addition was complete, the mixture was stirred for a further 15 minute period at 118°. The mixture was then poured into hot water and steam distilled. The aqueous distillate was extracted with chloroform and the extract was washed with water and dried over sodium sulphate. Evaporation of chloroform under reduced pressure yielded a yellow solid which upon crystallization from ethanol gave 5-bromo-3,4-dimethyl-salicylaldehyde of melting point 73°–74°.

22.9 g. (0.1 mol) of 5-bromo-3,4-dimethyl-salicylaldehyde were suspended in 100 ml. of ethanol and a solution of 6.1 g. (ca 0.1 mol) of potassium hydroxide in 75 ml. of ethanol was carefully added with stirring over a period of 15 minutes (the 5-bromo-3,4-dimethyl-salicylaldehyde initially dissolved, but towards the end of the addition, its potassium salt was precipitated). 8.5 ml. (0.1 mol plus 5%) of chloroacetone were then added dropwise with stirring over a period of 15 minutes. The internal temperature rose to 42°. Stirring was continued for an additional 2 hours, after which time the solvent was removed under reduced pressure. Water was added to the residue and the mixture was extracted three times with chloroform. The extract was washed once with water and dried over sodium sulphate. The dried solution was filtered and the filtrate was evaporated. The residue was crystallized from ethanol to give 2-acetyl-5-bromo-6,7-dimethyl-benzofuran in the form of a crystalline solid of melting point 137.5°–139.5°.

4.3 ml. (0.05 mol plus 5%) of sulphuryl chloride were added over a period of 10 minutes to a stirred solution of 13.36 g. (0.05 mol) of 2-acetyl-5-bromo-6,7-dimethyl-benzofuran in 75 ml. of chloroform. The mixture was slowly brought to boiling (30 minutes) and then kept at reflux for 2 hours. The mixture was then cooled, poured on to ice/water and extracted three times with chloroform. The extracts where combined, washed once with 2-N sodium carbonate solution, then once with water and dried over sodium sulphate. The solvent was removed under reduced pressure and the residue crystallized from ethanol/methanol to give 2-chloroacetyl-5-bromo-6,7-dimethyl-benzofuran of melting point 135°–140°. Recrystallization from ethanol raised the melting point to 141°–144°. When the chlorination was repeated, using 60.12 g. of 2-acetyl-5-bromo-6,7-dimethyl-benzofuran, a first crop of 2-chloroacetyl-5-bromo-6,7-dimethyl-benzofuran, of melting point 139°–143°C. was obtained.

EXAMPLE 19

42.2 g. (0.143 mol) of 2-chloroacetyl-5-bromo-6,7-dimethyl-benzofuran were suspended in a mixture of 210 ml. of dioxane and 35 ml. of water. The so-formed suspension was cooled to 0°. 3.99 g. (0.072 mol plus 25%) of sodium borohydride were then carefully added at 0°–5° over a period of 30 minutes and the mixture was stirred at 20° for 3 hours. The solvent was then removed under reduced pressure and the residue was treated with water and extracted three times with ether. The ether extracts were combined, washed once with water and dried over anhydrous sodium sulphate. The dried solution was filtered and the filtrate was evaporated to give a buff solid which was crystallized from benzene/(60°–80° petroleum ether) to yield 5-bromo-2-(2-chloro-1-hydroxyethyl)-6,7-dimethyl-benzofuran in the form of colorless needles of melting point 100°–102°.

EXAMPLE 20

A solution of 27.27 g. (0.09 mol) of 5-bromo-2-(2-chloro-1-hydroxyethyl)-6,7-dimethyl-benzofuran and 47 ml. (0.54 mol) of isopropylamine in 180 ml. of isopropanol was heated under reflux for 24 hours (thin layer chromatography of the reaction mixture showed the reaction product to be virtually uniform). The isopropanol and excess isopropyl amine were removed under reduced pressure and the solid residue vigorously shaken with excess 2-N aqueous sodium carbonate solution and filtered. The filter cake was shaken with water and again filtered, then shaken again with water, filtered once more, sucked dry anad crystallized from ethanol to give 5-bromo-2-(2isopropylamino-1-hydroxyethyl)-6,7-dimethyl-benzofuran of melting point 135°–138°.

EXAMPLE 21

5.44 g. of 5-bromo-2-(2-isopropylamino-1-hydroxyethyl)-6,7-dimethyl-benzofuran were dissolved in ethanol. The flask was flushed with nitrogen, 0.5 g. of 5% ENGLEHARDT palladium/carbon catalyst were added and the mixture was hydrogenated at room temperature and atmospheric pressure. After an uptake of hydrogen approximately 5% greater than that theoretically required, the catalyst was filtered off and the filtrate was evaporated to give a solid hydrobromide. Water was added and the suspension obtained was made basic with solid sodium carbonate. The basic mixture was extracted three times with ether. The ether extracts were combined, washed once with water and dried over sodium sulphate. The dried solution was filtered and evaporated to give solid crude 2-(2-isopropylamino-1-hydroxyethyl)-6,7-dimethyl-benzofuran which after crystallization from petroleum ether (boiling range 60°–80°) was found to have a melting point of 107.5°–109°.

EXAMPLE 22

2 g. (0.0061 mol) of 5-bromo-2-(2-isopropylamino-1-hydroxyethyl)-6,7-dimethyl-benzofuran were suspended in ca 26 ml. of 1.5% methanolic potassium hydroxide. The flask was flushed with nitrogen, 0.2 g. of 5% ENGLEHARDT palladium/carbon catalyst were added and the mixture was hydrogenated at room temperature and atmospheric pressure (the uptake of hydrogen was approximately 4% greater than that theoretically required and the rate of uptake fell rapidly after the uptake of 1 molar equivalent of hydrogen). The catalyst was filtered off and the filtrate was evaporated to give a solid. The solid waas added to water and the so-formed mixture was extracted three times with benzene. The benzene extracts were combined, washed once with 2-N sodium carbonate solution, then once with water and dried over sodium sulphate. The dried solution was filtered and evaporated to give a solid which was crystallized from petroleum ether (boiling range 60°–80°) to yield 2-(2-isopropylamino-1-hydroxyethyl)-6,7-dimethyl-benzofuran as needles of melting point 107°–108°.

EXAMPLE 23

8.52 g. of 2-(2-isopropylamino-1-hydroxyethyl)-6,7-dimethyl-benzofuran hydrochloride were dissolved in 200 ml. of methanol. The flask was flushed with nitrogen and 2 g. of 5% palladium/carbon catalyst were added. The mixture was hydrogenated at 20° and atmospheric pressure, a further 1 g. of catalyst being added after 24 hours to ensure complete hydrogenation. The total hydrogen uptake was 740 ml. (theory: ca 750 ml.). The catalyst was removed by filtration and the filtrate was evaporated to give a solid which was crystallized from methanol/ether to yield a racemate of 2-(2-isopropylamino-1-hydroxyethyl)-6,7-dimethyl-2,3-dihydro-benzofuran (designated as racemate A) as its hydrochloride of melting point 174° (softening at 150°). Two recrystallizations from ethanol gave the hydrochloride of melting point 179°–181.5°.

The mother liquors from the first crystallization were evaporated to a syrup which was basified and extracted with ether. The extract was evaporated to a syrup which was crystallized from petroleum ether (boiling range 60°–80°) to give the other racemate of 2-(2-isopropylamino-1-hydroxyethyl)-6,7-dimethyl-2,3-dihydro-benzofuran (racemate B) as crystals of melting point 67°–71°.

EXAMPLE 24

A solution of 3.1 g. (ca 0.05 mol) of potassium hydroxide in 30 ml. of ethanol was carefully added with stirring at room temperature over a period of 10 minutes to a solution of 10.8 g. (0.05 mol) of 5-bromo-3-methyl-salicylaldehyde in 100 ml. of ethanol. 4.8 g. (0.05 mol plus 5%) of chloroacetone were added dropwise over a period of 15 minutes to the resulting yellow solution. The mixture was stirred at room temperature for 20 hours, then poured into 500 ml. of water and extracted twice with chloroform. The combined extracts were washed with dilute sodium hydroxide solution and then with water and dried over sodium sulphate. The solvent was removed to give a yellow solid which was recrystallized from ethanol to yield 2-acetyl-5-bromo-7-methtyl-benzofuran as fine yellow needles of melting point 122°–123°.

4.9 g. (0.03 mol plus 20%) of sulphuryl chloride were added dropwise with stirring over 10 minutes to 7.6 g. (0.03 mol) of 2-acetyl-5-bromo-7-methyl-benzofuran in 30 ml. of chloroform. The mixture was heated at gentle reflux for 3 hours, cooled and poured on to ice. The aqueous layer and the organic layer were separated and the aqueous layer was extracted with chloroform. The chloroform extract was combined with the organic layer, washed with 2-N sodium carbonate solution and then with water and dried over sodium sulphate. The dried solution was filtered and the filtrate was evaporated under reduced pressure. The solid residue was recrystallized from ethanol to yield 2-chloroacetyl-5-bromo-7-methyl-benzofuran as fine yellow needles of melting point 134°–137°.

EXAMPLE 25

14.4 g. (0.05 mol) of 2-chloroacetyl-5-bromo-7-methyl-benzofuran were dissolved in a mixture of 100 ml. of dioxane and 20 ml. of water and the solution was cooled to 0°. 1.2 g. (0.025 mol plus 20%) of sodium borohydride were carefully added over a period of 30 minutes and the mixture was stirred at room temperature for 2 hours. The dioxane was removed under reduced pressure and the residue was diluted with ca 200 ml. of water and extracted twice with ether. The combined extracts were washed with water and with brine and dried over sodium sulphate. Removal of the solvent gave crude 5-bromo-2-(2-chloro-1-hydroxyethyl)-7-methyl-benzofuran, in almost quantitative yield, as a pale yellow oil.

EXAMPLE 26

The crude 5-bromo-2-(2-chloro-1-hydroxyethyl)-7-methyl-benzofuran (ca 0.05 mol) and 12 g. (0.2 mol) of isopropylamine were heated at reflux for 24 hours in 50 ml. of ethanol. The solvent and excess isopropylamine were then removed under reduced pressure and the residual solid was partitioned between ether and dilute hydrochloric acid. The aqueous acidic layer was washed with ether, made basic with dilute sodium hydroxide solution and extracted three times with ether. The combined extracts were washed with water and with brine and dried over sodium sulphate. Removal of the solvent left a brown solid which was crystallized from petroleum ether (boiling range 60°–80°) to give 5-bromo-2-(2-isopropylamino-1-hydroxyethyl)-7-methyl-benzofuran as buff crystals of melting point 120°–130°. By conventional procedures the last-mentioned base was converted into its hydrochloride. 5-Bromo-2-(2-isopropylamino-1-hydroxyethyl)-7-methyl-benzofuran hydrochloride melted at 158°–159°, after recrystallization from ethanol/ether.

EXAMPLE 27

1.75 g. (0.005 mol) of 5-bromo-2-(2-isopropylamino-1-hydroxyethyl)-7-methyl-benzofuran hydrochloride were dissolved in 50 ml. of ethanol and hydrogenated at room temperature and atmospheric pressure in the presence of 0.1 g. of 5% palladium-on-charcoal catalyst. After the uptake of hydrogen had exceeded that theoretically required by approximately 5%, the rate of absorption of hydrogen decreased considerably. The reaction was terminated at this point. After such termination, the catalyst was filtered off and the filtrate was evaporated to dryness. The residue was taken up in water and the solution was basified and extracted twice with ether. The extracts were washed with water and with brine and dried over sodium sulphate. The dried solution was filtered and evaporated to give 2-(2-isopropylamino-1-hydroxyethyl)-7-methyl-benzofuran as a white crystalline solid which was recrystallized from petroleum ether (boiling range 60°–80° to yield white needles of the product of melting point 90°–92°. The hydrochloride was prepared by dissolving the free base in ethanol and treating the solution with ethereal hydrogen chloride. The solid thus obtained was recrystallized from methanol/ether to give white microcrystalline 2-(2-isopropylamino-1-hydroxyethyl)-7-methyl-benzofuran hydrochloride of the melting point 162°–163°.

The free base of 5-bromo-2-(2-isopropylamino-1-hydroxyethyl)-7-methyl-benzofuran was hydrogenated in ethanol over a 5% palladium-on-charcoal catalyst in a similar manner to that described in the preceding paragraph. Wording up as described in the preceding paragraph gave 2-(2-isopropylamino-1-hydroxyethyl)-7-methyl-benzofuran.

EXAMPLE 28

In a manner analogous to that described in Example 24, 3-bromo-5-methyl-salicylaldehyde was reacted with chloroacetone to give 2-acetyl-7-bromo-5-methyl-benzofuran as cream-colored crystals of melting point 85° (after crystallization from ethanol).

In a manner analogous to that described in the second paragraph of Example 24, from 2-acetyl-7-bromo-5-methyl-benzofuran, there was obtained 2-chloroacetyl-7-bromo-5-methyl-benzofuran as yellow prisms of melting point 131°–133° (after recrystallization from ethanol).

2-Chloroacetyl-7-bromo-5-methyl-benzofuran was reduced in a manner analogous to that described in Example 25 to give 7-bromo-2-(2-chloro-1-hydroxyethyl)-5-methyl-benzofuran as a pale yellow oil. Without further purification, this oil was reacted with isopropylamine in accordance with the procedure set out in Example 26 to give 7-bromo-2-(2-isopropylamino-1-hydroxyethyl)-5-methyl-benzofuran which melted at 107° after crystallization from petroleum ether (boiling range 60°–80°). When the base was transformed into its hydrochloride by conventional procedures, 7-bromo-2-(2-isopropylamino-1-hydroxyethyl)-5-methyl-benzofuran hydrochloride melted at 136°–138° after recrystallization from ethanol/ether.

EXAMPLE 29

7-Bromo-2-(2-isopropylamino-1-hydroxyethyl)-5-methyl-benzofuran and its hydrochloride were hydrogenated according to the methods described in Example 27 to give 2-(2-isopropylamino-1-hydroxyethyl)-5-methyl-benzofuran as white crystals of melting point 111°–112° [after crystallization from petroleum ether (boiling range 60°–80°)]. The hydrochloride was obtained as white crystals of melting point 174°–176° (after crystallization from ethanol/ether).

EXAMPLE 30

In a manner analogous to that described in the first paragraph of Example 24, 3,5-dibromo-6-methyl-salicylaldehyde was reacted with chloroacetone to give 2-acetyl-5,7-dibromo-4-methyl-benzofuran in the form of white prisms of melting point 162°–163° (after recrystallization from ethanol).

In a manner analogous to that described in the second paragraph of Example 24, from 2-acetyl-5,7-dibromo-4-methyl-benzofuran, there was obtained 2-chloroacetyl-5,7-dibromo-4-methyl-benzofuran as fine white needles of melting point 187°–188° (after crystallization from ethanol).

2-Chloroacetyl-5,7-dibromo-4-methyl-benzofuran was reduced in a manner analogous to that described in Example 25 to give 5,7-dibromo-2-(2-chloro-1-hydroxyethyl)-4-methyl-benzofuran. Without further purification, this was reacted with isopropylamine in accordance with Example 26 to give 5,7-dibromo-2-(2-isopropylamino-1-hydroxyethyl)-4-methyl-benzofuran as grey crystals of melting point 123°–125°. 5,7-Dibromo-2-(2-isopropylamino-1-hydroxyethyl)-4-methyl-benzofuran hydrochloride was obtained by conventional procedures from the base as white crystals of melting point 200°–201° after crystallization from ethanol/ether.

EXAMPLE 31

5,7-Dibromo-2-(2-isopropylamino-1-hydroxyethyl)-4-methyl-benzofuran was hydrogenated according to the methods described in Example 27; both bromine atoms were hydrogenolysed at the same rate and after the uptake of the theoretical quantity of hydrogen, the rate of absorption decreased in a manner similar to that described in Example 27. 2-(2-isopropylamino-1-hydroxyethyl)-4-methyl-benzofuran was obtained as cream colored crystals of melting point 81°–82°. Treatment with ethereal hydrogen chloride gave 2-(2-isopropylamino-1-hydroxyethyl)-4-methyl-benzofuran hydrochloride which melted at 146°–148° after recrystallization from ethanol/ether.

EXAMPLE 32

In a manner analogous to that described in the first paragraph of Example 24, 5-bromo-3-ethyl-salicylaldehyde was reacted with chloroacetone to give 2-acetyl-5-bromo-7-ethyl-benzofuran as yellow crystals of melting point 68°–70°.

In a manner analogous to that described in the second paragraph of Example 24, from 2-acetyl-5-bromo-7-ethyl-benzofuran, there was obtained 2-chloroacetyl-5-bromo-7-ethyl-benzofuran as cream plates of melting point 108°–110° (after recrystallization from ethanol).

2-Chloroacetyl-5-bromo-7-ethyl-benzofuran was reduced in a manner analogous to that described in Example 25 to give 5-bromo-2-(2-chloro-1-hydroxyethyl)-7-ethyl-benzofuran as a yellow oil. Without further purification, this oil was reacted with isopropylamine in accordance with the procedure set out in Example 26 to give 5-bromo-2-(2-isopropylamino-1-hydroxyethyl)-7-ethyl-benzofuran. This low-melting free base was treated with ethereal hydrogen chloride to give 5-bromo-2-(2-isopropylamino-1-hydroxyethyl)-7-ethyl-benzofuran hydrochloride which melted at 102°–104° after recrystallization from ethanol/ether.

EXAMPLE 33

5Bromo-2-(2-isopropylamino-1-hydroxyethyl)-7-ethyl-benzofuran was hydrogenated according to the methods described in Example 27 to give 2-(2-isopropylamino-1-hydroxyethyl)-7-ethyl-benzofuran as an oil. The oily base was immediately converted into the hydrochloride by conventional procedures. The hydrochloride was crystallized from ethanol/ether to give white crystals of melting point 113° – 114°.

EXAMPLE 34

A solution of 243 g. (1.5 mol) of 3-allyl-salicylaldehyde in 1000 ml. of ethanol was treated at 20° with stirring with a solution of 91.5 g. of potassium hydroxide in 500 ml. of ethanol. 146 g. of chloroacetone were added in the course of 30 minutes with stirring to the resulting yellow potassium salt. The temperature of the mixture rose to 40°. The mixture was subsequently stirred at 20° for 20 hours, after which time water was added and most of the ethanol was removed under reduced pressure. The residue was extracted three times with ether and the combined extracts were washed with water and dried over sodium sulphate. Distillation of the dried solution gave 2-acetyl-7-allyl-benzofuran of boiling point 110° – 140°10.3 mm. Crystallization from isopropanol gave colorless plates of 10.3 point 45° – 47°.

115 g. of 2-acetyl-7-allyl-benzofuran were dissolved in 690 ml. of chloroform and the solution was treated dropwise with stirring in the course of 30 minutes with 55.2 ml. of sulphuryl chloride. The mixture was slowly heated to the reflux temperature (over the course of 20 minutes) and heated under gentle reflux for 2½ hours. After cooling, the mixture was poured on to ice and the aqueous layer was extracted several times with chloroform. The combined extracts were washed with sodium carbonate solution and water and dried over sodium sulphate. The dried solution was filtered and evaporated to give 2-chloroacetyl-7-allyl-benzofuran which melted at 59°–62° after crystallization from a small volume of ethanol. Recrystallization from petroleum ether (boiling range 40°–60°) gave pure material of melting point 66°–67°.

39.1 g. of 2-chloroacetyl-7-allyl-benzofuran in 167 ml. of dioxane and 42 ml. of water were carefully treated with stirring over the course of 30 minutes at 0° with 4 g. of sodium borohydride. After several hours at 20°, the solvent was removed under reduced pressure, water was added to the residue and the mixture was extracted three times with ether. There resulted crude 2-(2-chloro-1-hydroxyethyl)-7-allyl-benzofuran which did not crystallize.

25 g. of crude 2-(2-chloro-1-hydroxyethyl)-7-allyl-benzofuran in 60 ml. of ethanol were heated at reflux for 24 hours with 17.7 g. of isopropylamine. The solvent was then removed and the residue was dissolved in dilute hydrochloric acid. The solution was washed three times with ether and made basic with 2-N sodium hydroxide solution. 2-(2-Isopropylamino-1-hydroxyethyl)-7-allyl-benzofuran was extracted with ether and converted into the hydrochloride by means of ethereal hydrochloric acid. 2-(2-Isopropylamino-1-hydroxyethyl)-7-allyl-benzofuran hydrochloride crystallized from isopropanol in the form of colorless needles of melting point 118°–119°.

EXAMPLE 35

2.95 g. of 2-(2-isopropylamino-1-hydroxyethyl)-7-allyl-benzofuran hydrochloride in 20 ml. of methanol were hydrogenated in the presence of 0.5 g. of 5% palladium/carbon; 242 ml. of hydrogen were rapidly absorbed (theory: 244 ml.) over 10 minutes, after which time the hydrogenation was terminated. The catalyst was removed by filtration and the filtrate was concentrated. 2-(2-Isopropylamino-1-hydroxyethyl)-7-propyl-benzofuran hydrochloride separated from (ethyl acetate)/ether in the form of a white crystalline powder of melting point 83°–85°.

EXAMPLE 36

7.4 g. (0.05 mol.) of 2-allyl-paracresol, 3.75 g. of hexamethylenetetramine and 3.75 g. of paraformaldehyde were melted together at 100°. 15 ml. of glacial acetic acid were added with stirring over 1 to the melt and the temperature of the mixture was raised to 118°–120°. 4 ml. of concentrated sulfuric acid were added over a period of 1½ hours. The mixture was then poured into 200 ml. of hot water and steam distilled until no more oil came over in the distillate. The distillate was extracted twice with chloroform and the chloroform extracts were combined, washed with water and dried over anhydrous sodium sulfate. The dried solution was filtered and the chloroform was removed from the filtrate under reduced pressure. The residual oil was distilled to give 3-allyl-5-methyl-salicylaldehyde as a pale yellow oil of boiling point 98°/2 mm.; $n_D^{20}$ = 1.5602.

A solution of 21.3 g. of potassium hydroxide in 250 ml. of ethanol was added dropwise at room temperature to a stirred solution of 52.8 g. (0.3 mol.) of 3-allyl-5-methyl-salicylaldehyde in 350 ml. of ethanol to give a yellow solution of the corresponding potassium salt. 32.4 g. (0.3 mol.) of chloroacetone were carefully added over a period of 30 minutes and the mixture obtained was stirred at room temperature for 24 hours, then poured into 2 liters of water and extracted three times with chloroform. The chloroform extracts were combined, washed successively with water, dilute sodium hydroxide solution and water and dried over anhydrous sodium sulfate. The dried solution was filtered and the chloroform was removed from the filtrate under reduced pressure. The residual dark, viscous oil was distilled to give a yellow oil of boiling point 120° – 145°/2 mm. which solidified on cooling. Crystallization from ethanol gave 2-acetyl-7-allyl-5-methyl-benzofuran as white prisms of melting point 71° – 72°.

71 g. (0.525 mol.) of sulfuryl chloride were added with stirring over 20 minutes to 105.8 g. (0.5 mol.) of 2-acetyl-7-allyl-5-methyl-benzofuran in 500 ml. of chloroform. The mixture was then heated under reflux for 3 hours, cooled and poured on to ice-water. The organic and aqueous layers were separated and the aqueous layer was washed with chloroform. The combined washings and chloroform layer were washed with sodium bicarbonate solution and then with water and dried over anhydrous sodium sulfate. The dried solution was filtered and the chloroform was removed from the filtrate under reduced pressure. The solid residue was crystallized from ethanol to give 2-chloroacetyl-7-allyl-5-methyl-benzofuran as off-white crystals of melting point 75° – 77°.

12.4 g. (0.02 mol.) of 2-chloroacetyl-7-allyl-5-methyl-benzofuran were dissolved in a mixture of 120 ml. of dioxane and 30 ml. water and the solution was cooled to 0° in icewater. 1.2 g. of sodium borohydride were added in portions with stirring over 30 minutes and the mixture was stirred at room temperature for 3 hours. The dioxane was then removed under reduced pressure and the residue was diluted with water and extracted three times with ether. The combined extracts were washed with water and with brine and dried over sodium sulfate. The dried solution was filtered and the filtrate was evaporated under reduced pressure to give 7-allyl-2-(2-chloro-1-hydroxy-ethyl)-5-methyl-benzofuran as a pale yellow viscous oil.

Crude 7-allyl-2-(2-chloro-1-hydroxy-ethyl)-5-methyl-benzofuran (ca. 0.02 mol.) was heated under reflux for 24 hours in ethanol with 18 g. (0.3 mol.) of isopropylamine. The mixture was then cooled and the ethanol and excess isopropylamine were removed under reduced pressure. The residual oil was dissolved in dilute hydrochloric acid and the solution was washed twice with ether and made basic with 2-N sodium hydroxide solution. The liberated oil was extracted with two portions of ether. The combined extracts were washed with water and with brine and dried over sodium sulfate. The dried solution was filtered and the ether was evaporated from the filtrate under reduced pressure. On cooling to 0°, the residual oil became crystalline. Recrystallization from cyclohexane gave 7-allyl-2-(2-isopropyl-amino-1-hydroxyethyl)-5-methyl-benzofuran as a white powder of melting point 66° – 67°. The free base was converted into the hydrochloride by conventional procedures. The hydrochloride crystallized, with difficulty, from (ethyl acetate)/ether; melting point = 88° – 90°.

EXAMPLE 37

A solution of 2.73 g. (0.01 mol.) of 7-allyl-2-(2-isopropyl-amino-1-hydroxyethyl)-5-methyl-benzofuran in 40 ml. of ethanol was hydrogenated at room temperature and atmospheric pressure in the presence of 0.2 g. of 5% palladium-on-charcoal. After 10 minutes a quantity of hydrogen corresponding to that required for the hydrogenation of the double bond of the allyl group had been absorbed; no further uptake of hydrogen was observed in the next 15 minutes. The catalyst was removed by filtration through infusorial earth and washed with ethanol. Ethereal hydrogen chloride was added with cooling to the combined washings and filtrate; then dry ether was added to the mixture. Since no crystalline material was deposited on standing at 0°, the solution was evaporated to dryness and the residual viscous oil was dissolved in the minimum volume of ethyl acetate. From the solution, on adding dry ether and cooling to 0°, there was obtained 2-(2-isopropylamino-1-hydroxyethyl)-5-methyl-7-propyl-benzofuran hydrochloride as off-white prisms of melting point 108° – 109°.

EXAMPLE 38

A solution of 53.7 g. of potassium hydroxide in 300 ml. of ethanol was added to a solution of 176 g. (0.871 mol.) of 3,5-diallyl-salicylaldehyde in 700 ml. of ethanol. After stirring the mixture at 20° for 30 minutes, 92.7 g. (0.871 mol. + 15% excess) of chloroacetone were carefully added with stirring over 30 minutes, the temperatures rising to 55°. The mixture was stirred at 20° for 20 hours, after which time part of the ethanol was removed under reduced pressure and ca 300 ml. of water were added. The mixture obtained was extracted with ether and the ether extract was washed twice with water and dried over anhydrous sodium sulfate. The dried solution was evaporated to a syrup which was distilled to give a main fraction boiling at 155° – 160°/0.8 – 1.0 mm. The 2-acetyl-5,7-diallyl-benzofuran thus obtained was redistilled and boiled at 150° – 153°/1.0 mm.

A solution of 12 g. (0.05 mol.) of 2-acetyl-5,7-diallyl-benzofuran in 60 ml. of chloroform was cooled to 0° and 4.25 ml. (0.0525 mol.) of sulfuryl chloride were carefully added thereto over a period of 10 minutes with stirring. The temperature of the mixture obtained was gently raised to reflux temperature over a period of 30 minutes and kept there for 2½ hours. After this time, the mixture was poured on to ice and extracted three times with chloroform. The extracts were washed twice with 2-N sodium carbonate solution and once with water, dried over anhydrous sodium sulfate, filtered and evaporated to a syrup which was first crystallized from 95% isopropanol and then from petroleum ether (boiling range = 40° – 60°) to give 5,7-diallyl-2-chloroacetyl-benzofuran as creamy prisms of melting point 68° – 71°.

A solution of 8.24 g. (0.033 mol.) of 5,7-diallyl-2-chloroacetyl-benzofuran in 50 ml. of dioxane and 8 ml. of water was cooled to 0°. At this temperature, 0.8 g. (0.017 mol. + 25%) of sodium borohydride were added portionwise with stirring over 30 minutes. The mixture was stirred for a further 30 minutes at 0° – 5° and for 3½ hours at 20°. The solvent was then removed under reduced pressure and 50 ml. of water were added. The mixture was extracted three times with ether and the extracts were washed once with water and dried over anhydrous sodium sulfate. The dried extracts were evaporated to yield 5,7-diallyl-2-(2-chloro-1-hydroxyethyl)-benzofuran in the form of a yellow syrup.

0.033 mol. of 5,7-diallyl-2-(2-chloro-1-hydroxyethyl)-benzofuran and 12 g. (0.2 mol.) of isopropylamine in 50 ml. of isopropanol were boiled under reflux for 17 hours. The solvent and excess isopropylamine were then removed under reduced pressure and the residue was acidified with dilute hydrochloric acid. Water was added until the oily hydrochloride which had separated out dissolved. Any neutral material remaining was removed by extracting three times with ether, then the aqueous solution was made basic with 2-N sodium hydroxide solution and extracted three times with ether. The extracts were washed twice with water, dried over anhydrous sodium sulfate, filtered and evaporated to give a basic syrup. This was not crystallized; thin layer chromatography indicated the presence of both 5,7-diallyl-2-(2-isopropylamino-1-hydroxyethyl)-benzofuran and 5,7-diallyl-2-(1-isopropylamino-2-hydroxyethyl)-benzofuran. The syrup was chromatographed on alumina to yield a material shown by thin layer chromatography to consist solely of 5,7-diallyl-2-(2-isopropylamino-1-hydroxyethyl)-benzofuran. Upon recrystallization of the latter from petroleum ether (boiling range=40°–60°) at 0°, the product melted at 55°–58°. The crystalline base was converted into the hydrochloride which was crystallized from a large volume of (ethyl acetate)/ether as colorless prisms of melting point 94°–97°.

EXAMPLE 39

0.25 g. (0.000744 mol.) of 5,7-diallyl-2-(2-isopropylamino-1-hydroxyethyl)-benzofuran hydrochloride were dissolved in 15 ml. of methanol. The flask containing the solution was flushed out with nitrogen and 0.05 g. of 5% palladium-on-charcoal were added. The mixture was hydrogenated at 20° and atmospheric pressure; the theoretical quantity of hydrogen was absorbed in 5 minutes. The catalyst was then removed by filtration and the filtrate was evaporated to a syrup. This was codistilled with ethyl acetate, then crystallized from ethyl acetate to give 2-(2-isopropylamino-1-hydroxyethyl)-5,7-dipropyl-benzofuran hydrochloride in the form of colorless prisms of melting point 115°–116°.

The novel compounds of the present invention can be incorporated into pharmaceutical dosage forms as follows:

EXAMPLE 40

20 g. of 2-(2-isopropylamino-1-hydroxyethyl)-6,7-dimethyl-benzofuran hydrochloride were mixed with 40 g. of lactose. The mixture was granulated using 0.9 g. of 10 percent aqueous gelatin and the granulate was mixed with 3.5 g. of maize starch. 0.6 g. of magnesium stearate were added and the mixture was compressed according to known methods to give tablets each containing 200 mg. of active material.

EXAMPLE 41

10 g. of 2-(2-isopropylamino-1-hydroxyethyl)-6-methyl-benzofuran hydrochloride were mixed with 10 g. of lactose. The mixture was granulated using 0.5 g. of 10 percent aqueous gelatin and the granulate was mixed with 2.5 g. of maize starch. 0.25 g. of stearic acid were added and the mixture was compressed according to known methods to give tablets each containing 100 mg. of active material.

EXAMPLE 42

Tablets each containing 25 mg. of 5,7-diallyl-2-(2-isopropyl-amino-1-hydroxyethyl)-benzofuran hydrochloride, 114 mg. of lactose, 50.0 mg. of corn starch, 8.0 mg. of pregelatinized corn starch and 3.0 mg. of calcium stearate and having a total weight of 200.0 mg. were prepared by mixing the active material with the lactose, corn starch and pregelatinized corn starch in a suitable mixer, passing the mix through a comminuting machine, returning the mixture to the mixer, moistening it with water so as to form a thick paste, passing the moist mass through a screen, drying the moist granules on paper-lined trays at 45°, returning the dried granules to the mixer, adding the calcium stearate, mixing well and compressing the granulate at a tablet weight of 200 mg. using standard 8 mm. diameter concave punches.

EXAMPLE 43

Capsules each containing 15.0 mg. of 5,7-diallyl-2-(2-isopropylamino-1-hydroxyethyl)-benzofuran hydrochloride, 170.0 mg. of lactose, 30.0 mg. of corn starch and 5.0 mg. of talc and having a total net weight of 220.0 mg. were prepared by mixing the active material with the lactose and corn starch in a suitable mixer, passing the mix through a comminuting machine, returning the mixture to the mixer, adding the talc, blending thoroughly and filling the resulting powder into hard shell geletin capsules on a capsulating machine.

EXAMPLE 44

Capsules each containing 15.0 mg. of 2-(2-isopropylamino-1-hydroxyethyl)-7-allyl-benzofuran hydrochloride, 170.0 mg. of lactose, 30.0 mg. of corn starch and 5.0 mg. of talc and having a total net weight of 220.0 mg. were prepared by mixing the active material with the lactose and corn starch in a suitable mixer, passing the mix through a comminuting machine, returning the mixture to the mixer, adding the talc, blending thoroughly and filling the resulting powder into hard shell gelatin capsules on a capsulating machine.

EXAMPLE 45

Tablets each containing 25 mg. of 2-(2-isopropylamino-1-hydroxyethyl)-7-allyl-benzofuran hydrochloride, 114 mg. of lactose, 50.0 mg. of corn starch, 8.0 mg. of pregelatinized corn starch and 3.0 mg. of calcium stearate and having a total weight of 200.0 mg. were prepared by mixing the active material with the lactose, corn starch and pregelatinized corn starch in a suitable mixer, passing the mix through a comminuting machine, returning the mixture to the mixer, moistening it with water so as to form a thick paste, passing the moist mass through a screen, drying the moist granules on paper-lined trays at 45°, returning the dried granules to the mixer, adding the calcium stearate, mixing well and compressing the granulate at a tablet weight of 200 mg. using standard 8 mm. diameter concave punches.

EXAMPLE 46

10 g. of 7-bromo-2-(2-isopropylamino-1-hydroxyethyl)-5-methyl-benzofuran hydrochloride were mixed with 10 g. of lactose. The mixture was granulated using 0.5 g. of 10% aqueous gelatin and the granulate was mixed with 2.5 g. of maize starch. 0.25 g. of stearic acid were added and the mixture was compressed according to known methods to give tablets each containing 100 mg. of active material.

EXAMPLE 47

4.8 g. of 5-bromo-2-(2-tert.-butylamino-1-hydroxyethyl)-7-ethyl-benzofuran in 50 ml. of ethanol were hydrogenated at room temperature and atmospheric pressure in the presence of 0.3 g. of 5% palladium-on-carbon catalyst. After the uptake of one equivalent of hydrogen, the hydrogenation was terminated, catalyst was filtered off and the filtrate was evaporated to dryness. The residue was basified and extracted twice with ether. The combined ether extracts were worked up in the usual manner to give 2-(2-tert.-butylamino-1-hydroxy-ethyl)-7-ethyl-benzofuran in the form of an oil. From this oil were obtained 2.9 g. of the hydrochloride as crystals of melting point 145°–146°C. (from ethanol/ether).

The starting material may be prepared as follows:

68.3 g. (0.182 mol.) of trimethyl-phenyl-ammonium perbromide were added in a single portion at 20°C. to a stirred solution of 48.5 g. (0.182 mol) of 5-bromo-2-acetyl-7-ethyl-benzofuran in 400 ml. of dry tetrahydrofuran. The resulting mixture was stirred at 20°C. for 3 hours, during which time trimethyl-phenyl-ammonium bromide precipitated out. The mixture was then poured into water and extracted three times with ether. The combined ether extracts were washed successively with water, saturated sodium bicarbonate solution, water and saturated brine, dried over anhydrous sodium sulfate, filtered and evaporated under reduced pressure. The solid residue was recrystallized from ethanol to yield 43.1 g. of 5-bromo-2-bromoacetyl-7-ethyl-benzofuran as yellow crystals of melting point 101°–102°C.

1.35 g. of sodium borohydride were added portionwise at room temperature over a period of 20 minutes to a stirred solution of 17.3 g. (0.05 mol) of 5-bromo-2-bromoacetyl-7-ethyl-benzofuran in 100 ml. of dioxane and 25 ml. of water. The mixture was stirred at room temperature for 3 hours, then dioxane was removed by evaporation at 40°C. under reduced pressure and the residue was diluted with water and extracted three times with ether. The combined ether extracts were worked up in the usual manner to yield 16.0 g. of crude 5-bromo-2-(2-bromo-1-hydroxy-ethyl)-7-ethyl-benzofuran as a viscous oil.

16.0 g. of crude 5-bromo-2-(2-bromo-1-hydroxyethyl)-7-ethyl-benzofuran and 37.0 g. of tert.-butylamine were heated at 100°C. in a sealed autoclave for 24 hours. After cooling, excess tert.-butylamine was evaporated off and the residue was taken up in dilute aqueous hydrochloric acid. The aqueous solution was washed twice with ether, basified with dilute aqueous sodium hydroxide solution and extracted twice with ether. The combined ether extracts were washed with water and with brine, dried over anhydrous sodium sulfate, filtered and evaporated. The solid residue was crystallized from petroleum ether (boiling range = 60°–80°C.) to yield 4.7 g. of 5-bromo-2-(2-tert.-butylamino-1-hydroxy-ethyl)-7-ethyl-benzofuran as buff crystals of melting point 101°–103°C. The corresponding took the form of cream crystals of melting point 188°–190°C. (from ethanol/ether).

EXAMPLE 48

A warm solution of 38.6 g. (0.1 mol) of (−)-0,0-bis(-para-toluoyl)-D-tartaric acid in 140 ml. of ethyl acetate was added to a solution of 26.1 g. (0.1 mol) of racemic 2-(2-tert.-butyl-amino-1-hydroxy-ethyl)-7-ethyl-benzofuran in 140 ml. of ethyl acetate. The resulting mixture was allowed to stand at 25°C. for 16 hours, then crystals were filtered off and recrystallized to constant specific rotation $\{[\alpha]_{365}^{20}=-211°\,(c=0.1\text{ in acetone})\}$ and to constant melting point (203°–204°C.). The resulting crystalline (−)-0,0-bis(paratoluoyl)-D-tartrate was converted into the corresponding free base { a pale yellow oil, $[\alpha]_{365}^{20} = +80°\,(c = 20\text{ in ethanol})$} from which were obtained 8.26 g. of crystalline (+)-2-(2-tert.-butylamino-1-hydroxy-ethyl)-7-ethyl-benzofuran hydrochloride of melting point 122°C. [from (ethyl acetate)/ether]; $[\alpha]_{365}^{20} = +135°\,(c = 1\text{ in ethanol})$.

The combined mother liquors from the preparation and recrystallization of the foregoing (−)-0,0-bis(-paratoluoyl)-D-tartrate were evaporated to dryness and the residue was partitioned between ether and dilute aqueous sodium hydroxide solution. The ether layer was separated off and worked up in the usual manner to give 17.4 g. of a viscous oil. This oil was dissolved in 100 ml. of ethyl acetate and to the resulting solution was added a warm solution of 25.7 g. of (+)-0,0-bis(paratoluoyl)-L-tartaric acid in 100 ml. of ethyl acetate. The resulting mixture was allowed to stand overnight, then crystals were filtered off and recrystallized from ethanol to constant specific rotation $\{[\alpha]_{365}^{20} = +211°\,(c = 0.1\text{ in acetone})\}$ and to constant melting point (203°–204°C.). The resulting crystalline (+)-0,0-bis-(paratoluoyl)-L-tartrate was converted into the corresponding free base { a viscous oil, $[\alpha]_{365}^{20} = -79°\,(c = 20\text{ in ethanol})$} from which were obtained 6.3 g. of (−)-2-(2-tert.-butylamino-1-hydroxy-ethyl)-7-ethyl-benzofuran hydrochloride as white crystals of melting point 122°–123°C. [from (ethyl acetate/ether]; $[\alpha]_{365}^{20} = -136°\,(c = 1\text{ in ethanol})$.

We claim:
1. 2-(2-isopropylamino-1-hydroxy-ethyl)-6,7-dimethyl-benzofuran.
2. 2-(2-isopropyl-amino-1-hydroxyethyl)-5,7-dimethyl-benzofuran.
3. A compound of the formula 2-(2-isopropylamino-1-hydroxyethyl)-7-methyl-benzofuran.
4. 2-(2-isopropylamino-1-hydroxyethyl)-7-propyl-benzofuran.
5. 2-(2-isopropylamino-1-hydroxyethyl)-7-ethyl-benzofuran.
6. 2-(2-tert.-butylamino-1-hydroxyethyl)-7-ethyl-benzofuran.

* * * * *